United States Patent [19]
Robertsson

[11] 3,884,074
[45] May 20, 1975

[54] SONIC LIQUID LEVEL MEASURING APPARATUS
[75] Inventor: Hans R. Robertsson, Molndal, Sweden
[73] Assignee: Saab-Scania Aktiebolag, Linkoping, Sweden
[22] Filed: May 8, 1974
[21] Appl. No.: 468,164

[52] U.S. Cl. .............................................. 73/290 V
[51] Int. Cl. .......................................... G01f 23/38
[58] Field of Search ...................... 73/290 V, 290 R

[56] References Cited
UNITED STATES PATENTS
2,883,861   4/1959   Van Valkenburg et al. ...... 73/290 V
3,079,596   2/1963   Atkinson ........................... 73/290 V

Primary Examiner—Harry N. Haroian

[57] ABSTRACT

An elongated vibration transmitting body, extending vertically in a tank, is coupled at its top to an exciter that recurrently imparts brief periods of vibration to the body. A similar vibration receiving body, in spaced, parallel relation to the transmitting body, is coupled at its tip to a vibration detector. Rigid horizontal members connected to both bodies and vertically spaced at uniform intervals serve as sonic bridges between them. Calculating means, connected with the exciter and the detector, determines level of liquid in the same tank on the basis of number of crosstalks through sonic bridges and time between crosstalk through lowest exposed sonic bridge and beginning of crosstalk through liquid.

12 Claims, 11 Drawing Figures

SONIC LIQUID LEVEL MEASURING APPARATUS

This invention relates to apparatus for measuring liquid level in a tank with the use of sonic vibrations; and the invention is more particularly concerned with liquid level measurement apparatus of the type that comprises a pair of elongated vibration propagating bodies that extend down into a tank from near its top, one of said bodies being coupled at its upper end to a vibration producing exciter and the other being similarly coupled to a vibration detector, the exciter and detector being connected with a calculating device that measures the time required for vibration to travel from the exciter to the detector and on that basis produces an output signifying the liquid level in the tank.

The use of sonic vibrations (which may be at supersonic frequency) for sensing the level of liquid in a tank is advantageous in many situations. A float gage has moving parts that can wear and get out of order, whereas a sonic sensing device has no moving parts in the conventional sense. A sight gage, comprising a transparent vertical tube mounted on the exterior of the tank, is inherently fragile and must necessarily be located where it may be struck by traffic moving near the tank, whereas a sonic device has its parts out of the way, within the tank and on top of it. As compared with certain other types of liquid level detectors, a sonic device offers the advantage of safety in the presence of combustible or chemically unstable materials inasmuch as it does not require the presence inside the tank of electric currents or electrical conductors that might give rise to electrolysis, short circuits or other dangers, and its parts that are inside the tank can be made of any material that is capable of withstanding the corrosive action of the tank contents.

Notwithstanding the theoretical advantages of sonic devices for sensing liquid levels in tanks, they have not had much application in practice, mainly because prior devices employing sonic principles have been inaccurate.

Sonic liquid level apparatus heretofore available has been of two general types. In one, exemplified by U.S. Pat. No. 3,394,589, vibration propagated through gas in the top of the tank was reflected from the surface of the liquid, and the time required for the "round trip" of the vibration was taken as a measure of the height of the liquid level. In the particular apparatus of that patent, an elongated tubular wave guide extended down into the tank from its top. A bleed hole near the upper end of the tube allowed liquid to rise in the tube to the prevailing level in the tank. The tube was coupled at its top to a transducer that transmitted a sound wave down through the column of gas in it, to be guided by the tube for return to the transducer after being reflected off of the surface of the liquid in the tube. Inasmuch as the vibration propagating medium was essentially a gas, and the velocity of propagation of a sonic wave through a gas varies rather markedly with the temperature of the gas, the device of Pat. no. 3,394,589 could not provide satisfactorily accurate results in situations where substantial variations in temperature could be expected.

The other general type of sonic liquid level sensing apparatus heretofore proposed is exemplified by U.S. Pat. No. 3,080,752, wherein a pair of elongated vibration propagating bodies extend down into the liquid in a tank, from the top thereof, in parallel laterally spaced relation to one another. One of these, comprising a transmitting body, was coupled at its top to an exciter that induced vibration in it; the other, comprising a receiving body, was coupled to a detector that produced electrical signals in response to received vibrations. The time interval between production of a vibration and detection of it was in part proportional to the lengths of the elongated bodies that were above the surface of the liquid, but it was also a function of the rate of propagation of the sonic wave through the liquid and of the distance between bodies. Inasmuch as the velocity of the sonic wave through the liquid could very rather widely with the physical and chemical conditions of the liquid, the data used for obtaining a measurement of the liquid level tended to include an unknown element that greatly impaired the accuracy of the results obtained from it. Compensation could be made for this unknown value, but at the expense of duplicating the receiving bodies and detectors and substantially complicating the calculating device with which the exciter and detectors cooperated. Furthermore the accuracy of the apparatus was impaired by variations and changes of the velocity of vibration propagation as a consequence of variations and changes of temperature along the vibration propagating bodies, the presence of contaminants on their surfaces, irregularities in the geometry of the bodies due to manufacturing imperfections, and any variations in the vibration frequency of the exciter. There was a further disadvantage, under some conditions, in the fact that the vibration propagating bodies were unbraced in the tank but nevertheless had to be maintained in fixed, exactly parallel relationship to one another to ensure such accuracy as could be obtained.

The present invention has for its general object the provision of apparatus for the measurement of liquid level in a tank with the use of sonic vibrations, which apparatus has all of the advantages of prior devices for sonic sensing of liquid level but is very much more accurate, being substantially unaffected by variations in physical and chemical conditions of the liquid in the tank and the gas above it, changes and variations in temperature of the bodies comprising the apparatus, unavoidable shifts in excitation frequency, and changes and imperfections in boundary conditions of said bodies, including accumulation of foreign material on their surfaces.

More specifically it is an object of the invention to provide apparatus by which an output can be produced that signifies the level of liquid in a tank, which apparatus operates on the principle of generating a brief period of sonic vibration (which may be at a supersonic frequency) and measuring the time required for that vibration to travel through vibration propagating bodies from an exciter that generates it to a detector that responds to it, and wherein the results obtained are substantially accurate notwithstanding changes and variagions in the temperature of gas above the liquid, variations in the velocity of propagation of vibration through the liquid or the gas, and variations in the velocity of such propagation in the vibration propagating bodies due to unpredictable factors such as manufacturing imperfections and accumulations of foreign matter on their surfaces.

It is also a specific object of this invention to provide liquid level sensing apparatus of the character described having vibration propagating bodies that structurally reinforce and support one another against displacement out of the relationship that is desired for them, so that the apparatus is well adapted for installation in a tank in which there is a vigorous turbulent flow of liquid or a similar adverse condition that would militate against the use of prior liquid level measurement apparatus.

In general the objects of the invention are achieved with apparatus comprising an elongated vibration propagating body which extends down into a tank and which is coupled at its upper end to an exciter that can recurrently impart sonic vibration to the body for a brief period, at least one other vibration propagating body which extends down into the tank in parallel, laterally spaced relation to the first one and which is coupled at its upper end to a vibration detector; and a plurality of brace-like, elongated, horizontal members that extend transversely to said bodies and connect them, the horizontal members serving as sonic bridges by which vibrations are transmitted between the bodies and also serving to maintain the bodies in fixed relation to one another. For each brief interval or pulse of vibration that the exciter induces in the first body, the detector responds to successive brief periods of vibration as vibration is transmitted to it, in turn, through each of the sonic bridges that is above the level of the liquid; and the detector finally detects vibration transmitted through the liquid itself. On the basis of the number of such periods of vibration detected for each period of impressed vibration, and the delay interval between the last two periods of received vibration, a calculating device connected with the exciter and the detector produces an output that denotes the level of liquid in the tank.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of embodiments of the invention constructed according to the best modes so far devised for the practical application of the principles thereof, and in which.

Figures 1, 2A, 2B, 2C, 3A, 3B:
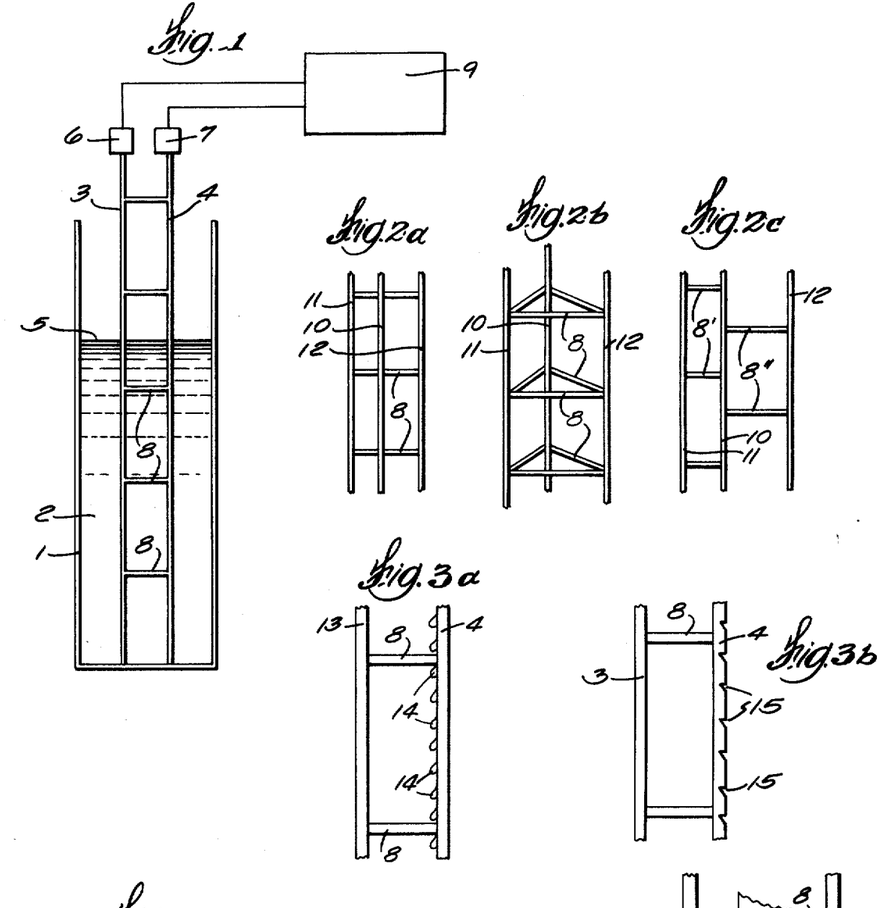
FIG. 1 is a more or less diagrammatic view of apparatus for measuring the level of liquid in a tank, embodying the principles of the present invention.
FIGS. 2a–2c illustrate modified embodiments of the vibration propagating bodies and their connecting members in apparatus of the present invention.
FIGS. 3a–3e illustrate further modifications of the invention for improving the transmission of vibration from one to the other of the vibration propagating bodies.

Referring now to the accompanying drawings, the numeral 1 designates generally a tank or similar enclosure that is adapted to hold liquid 2 in varying quantities. The level of the upper surface 5 of that liquid can be measured from time to time by means of the apparatus of this invention.

The liquid level measuring apparatus comprises a first elongated vibration propagating body 3, which can be in the nature of a rod of metal or other material having good sonic conductivity and which extends down into the tank from near the top thereof, and at least one other elongated vibration propagating body 4 which can be identical to the first one and which extends down into the tank in parallel laterally spaced relation to the first one.

The vibration propagating body 3 can be regarded as a transmitting body because it is coupled at its upper end to an exciter 6 that is arranged, in known manner, to produce recurrent brief periods of sonic vibration in the body 3. Such vibration may be at an inaudibly high (supersonic) frequency. The other body 4 can be regarded as a receiving body, inasmuch as it is coupled at its upper end to a vibration detector 7 that generates electrical signals in response to vibrations imparted to it by the body 4. The exciter 6 and the detector 7 are both connected with a calculating device 9 that is described hereinafter.

Sonic vibration tends to be propagated through a solid body in various modes simultaneously, and each mode of vibration tends to be propagated at a different velocity from the others, the velocity of propagation of any one mode being itself dependent upon such characteristics as Young's modulus, Poisson's ratio and density of the material. Moreover, sound propagation velocities in a rod are dependent upon geometry of the rod (particularly upon the ratio of rod diameter to wavelength) and upon interactions with any deposits or coatings on the rod surface.

To minimize the number of possible modes of sound propagation through the bodies 3 and 4, each of them is in the form of a rod having a diameter equal to or somewhat less than one-quarter of the wavelength of the sound vibration. The rod diameter should not be greatly below one-quarter wavelength, for if it were, there would be exessive attenuation of the sound wave through the rod, and deposits on its surface would have an undesirably large influence on measurement results. With the preferred geometry of the vibration propagating bodies 3 and 4, the predominant mode of propagation of sound vibrations through them will be the longitudinal one. The main advantage of this is that only longitudinal modes can be practically propagated through a liquid.

In accordance with the present invention, the vertical vibration propagating bodies 3 and 4 are connected to opposite ends of elongated, horizontal brace-like members 8 that are preferably spaced apart by equal vertical distances. The horizontal members 8 are rigid and are preferably similar to the bodies 3 and 4 with respect to cross section, but they are made of a different material, for reasons explained below. Because of their rigid connections to the vertical bodies 3 and 4, the horizontal members 8 serve to keep those bodies fixed in spaced, parallel relation to one another and enable them to cooperate in reinforcing and supporting one another.

In addition to this structural function, the horizontal members also perform the important function of serving as sonic bridges between the vertical bodies 3 and 4. As a vibration wave travels down the transmitting body 3 from the exciter 6, it moves across each of the horizontal bridging members in turn, and from each bridging member a vibration wave then travels up through the receiving body 4 and to the detector 7. The detector 7 thus receives a succession of wave impulses, one for each horizontal member that is above the level of the liquid, and a final one from vibration that is propagated through the liquid. Under substantially all ambient conditions, therefore, each of the horizontal members comprises part of a wave path through solid material in which the velocity of wave propagation is known or readily ascertainable and is substantially constant irrespective of ambient conditions.

The bridging members are preferably not made of the same material as the rod-like bodies 3 and 4 because each of the horizontal members should transmit only a small fraction of the sound wave amplitude of the desired mode from the transmitting body 3 to the receiving body 4. If the bridging members did not substantially attenuate the sound vibrabions, a vibration pulse transferred to the receiving body 4 through one of the bridging members could be transmitted from the receiving body 4 back into the transmitting body 3 through a higher bridging member, and thence back again into the receiving body 4 through a still higher bridging member, following a zigzag course upwardly to produce a spurious output. The importance of having the horizontal members substantially attenuate the sound vibrations that they transmit will be further apparent as the description proceeds.

The attenuation of sound vibration in the briding members can be controlled by the selection of the material of which they are made. A preferred material is glass-fibre-reinforced epoxy plastic. Further attenuation can be obtained if the plastic is mixed with an appropriate amount of metal powder.

It will be understood that the exciter 6 and the detector 7, both of which can be regarded as transducers, preferably have their respective couplings to the bodies 3 and 4 on a single horizontal plane that can be at the roof of the tank or can be taken as an arbitrary datum to which liquid level can be referred.

The calculating apparatus 9, in counting the number of periods of detected vibration resulting from each period of excited vibration, can accurately take account of the number of horizontal members 8 that are above the liquid level; and the time interval between the last two detected vibration periods corresponds to the distance between the top of the liquid and the lowest exposed briding member. If, as is preferred, the horizontal members are spaced apart by uniform vertical intervals, or are arranged in some other regularly spaced relationship to one another, the distance between the liquid and the lowest exposed bridging member can be calculated with fairly good accuracy, not wiithstanding any error in the assumed velocity of wave propagation through the liquid, inasmuch as any error in such calculation will correspond to only a small fraction of the spacing between horizontal members, which spacing, in turn, is only a fraction of the height of the tank. To further minimize error due to any inaccuracy in the assumed velocity of sound propagation through the liquid, the distance between the transmitting and receiving bodies is preferably rather small. A suitable length for the bridging members is on the order of 10 to 30 mm.

Before an explanation is given of the calculating apparatus 9, attention is directed to various modifications of the sensing apparatus that are illustrated in FIGS. 2a–2c and 3a–3e, which are intended to achieve further improvement in measuring accuracy. FIGS. 2a–2c show sensing apparatus in which there are two vertical receiving bodies 11 and 12 that are each coupled to a detector like the detector 7 of FIG. 1, and a single vertical transmitting body 10 that is coupled to an exciter like the exciter 6.

The above mentioned Pat. No. 3,080,752 explains the advantages of having two receiving bodies, each coupled with a detector, one of said bodies being spaced farther than the other from the transmitting body 10. Briefly, the provision of two receiving bodies at different distances from the transmitting body permits an exact allowance to be made for the time required for propagtion of a wave through the liquid, irrespective of the velocity of propagation through that liquid. Preferably one of the receiving bodies 12 is twice as far as the other one 11 from the transmitting body 10, but any other distance ratio can be used that makes for convenient calculation. If the distance ratio is 2:1, and the difference between the times for liquid borne signals to reach the respective detectors for the bodies 11 and 12 is subtracted from the time required for the liquidborne signal to pass from the exciter to the detector for the nearer receiving body 11, the remainder is the time required for the wave to pass through only the exposed lengths of the bodies 10 and 11 and is thus directly proportional to twice the distance between the surface of the liquid and the plane of the transducers.

In FIG. 2a the three vertical bodies 10, 11, 12 are coplanar, and the receiving bodies 11, 12 have a 2:1 ratio with respect to their distances from the transmitting body 10. The horizontal members 8 that connect the bodies 10 and 11 are lengthwise aligned with those that connect the bodies 10 and 12, and those horizontal members are spaced apart at uniform vertical intervals.

In FIG. 2b the vertical bodies 10, 11, 12 are arranged in an isoceles triangle, with the nearer receiving body 11 at the apex of the triangle and the transmitting body 10 and the farther receiving body 12 at the base corners of the triangle. The horizontal members 8 are correspondingly arranged in triangular sets, each set disposed in a horizontal plane, and, again the sets of horizontal members 8 are spaced apart by uniform vertical distances.

In FIG. 2c the three vertical bodies 10, 11, 12 lie in a single vertical plane that also contains the horizontal members, but the horizontal members 8' that connect bodies 10 and 11 are in vertically offset relation to the horizontal members 8" that connect bodies 10 and 12. This arrangement has the advantage of separating in time the vibrations that come into the detectors for the respective bodies 11 and 12.

It will be evident that as much as possible of the vibration energy that is propagated through the liquid should reach the detector or detectors. With improved transmission of vibration through the liquid, and between the liquid and the vertically extending bodies, it is possible to decrease the energy expended at the exciter and improve the dynamics of the calculating means while maintaining measuring accuracy. As the description proceeds, it will be seen that for best performance of the calculating means, the output of the vibration detector 7 should have a larger amplitude in response to vibration transmitted through the liquid than in response to vibration transmitted through the bridging members.

FIGS. 3a–3e illustrate various ways of obtaining improved vibration transmission through the liquid. Due to the difference in sound propagation velocities between solid and liquid media, sound vibrations are propagated from the transmitting body 3 into the liquid mainly in an obliquely downward and outward direction. In the absence of one of the expedients illustrated in FIGS. 3a–3e, or an equivalent expedient, the vibration transmitted through the liquid would tend to be transmitted downwardly in the receiving body 4, rather than upwardly to the vibration detector 7. The small portion of such vibration that would reach the detector would be due to boundary effects at the surface of the liquid, scattering in the liquid and imperfections on the receiving body surface.

In FIG. 3a the receiving body 4 is at least partly covered, at its side facing the transmitting body 3, with a material that has a surface with numerous projections 14. These projections serve to scatter the sound wave and reflect it upwardly in the receiving body, towards the detector 7. There is some acoustical impedance matching effect from the covering, and for maximum advantage the acoustical impedance of the covering material should be substantially equal to the geometric mean value of the impedance of the liquid and of the vertical bodies 3 and 4.

In FIG. 3b the receiving body 4 is provided with cavities or notches 15 at its side remote from the transmitting body 3, again for the purpose of producing a scattering and reflection that improves transmission of vibration from the liquid 2 through the body 4 to the detector 7.

Figure 3C:
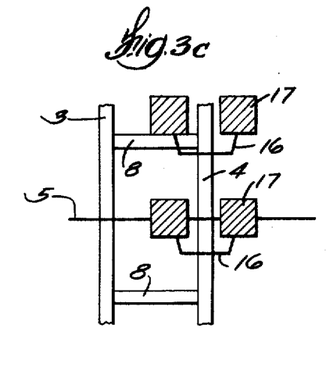
Figure 3D:
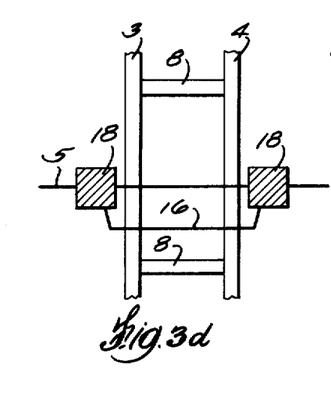
Figure 3E:
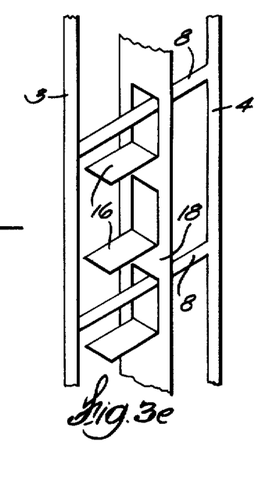

This same function can be fulfilled by the provision of horizontal reflecting surfaces 16, as illustrated in FIGS. 3c–3e. In FIG. 3c there is a reflecting surface between each pair of horizontal members 8, carried by a float 17 that embraces the body 4 and can move bouyantly up and down along it with changes in the liquid level. The float 17 holds the reflecting surface 16 just below the liquid surface 5. Alternatively, as shown in FIG. 3d, the reflecting surface can be carried at a level a little below that of the liquid surface by a single float 18 that is movable up and down all along the vertical bodies 3 and 4. Still another alternative is illustrated in FIG. 33, wherein a plurality of reflecting surfaces 16' are fixed at vertically spaced intervals to an elongated upright fixed support 18' which is so located that the reflecting surfaces are disposed between the vibration propagating bodies 3 and 4.

The transmission of vibration from the transmitting body 3 to the receiving body 4 can be designated "crosstalk." Generally, the function of the calculating device 9 is to determind, firstly, the number of crosstalks through exposed bridging members 8 (i.e., horizontal members above the surface of the liquid), and, secondly, to determine the time between the last crosstalk through a member 8 and the beginning of crosstalk through the liquid 2. By relating the last-mentioned time to the time interval between successive crosstalks through bridging members 8, and preferably to the time between crosstalks through the two lowest exposed bridging members, the effect of any variation in the propagation velocity along the vertical bodies is minimized. In general, the calculating device accurately measures time intervals by counting pulses generated by a stable oscillator during each time interval to be measured. The number of pulses thus counted is a function of the height to be measured.

Figure 4:
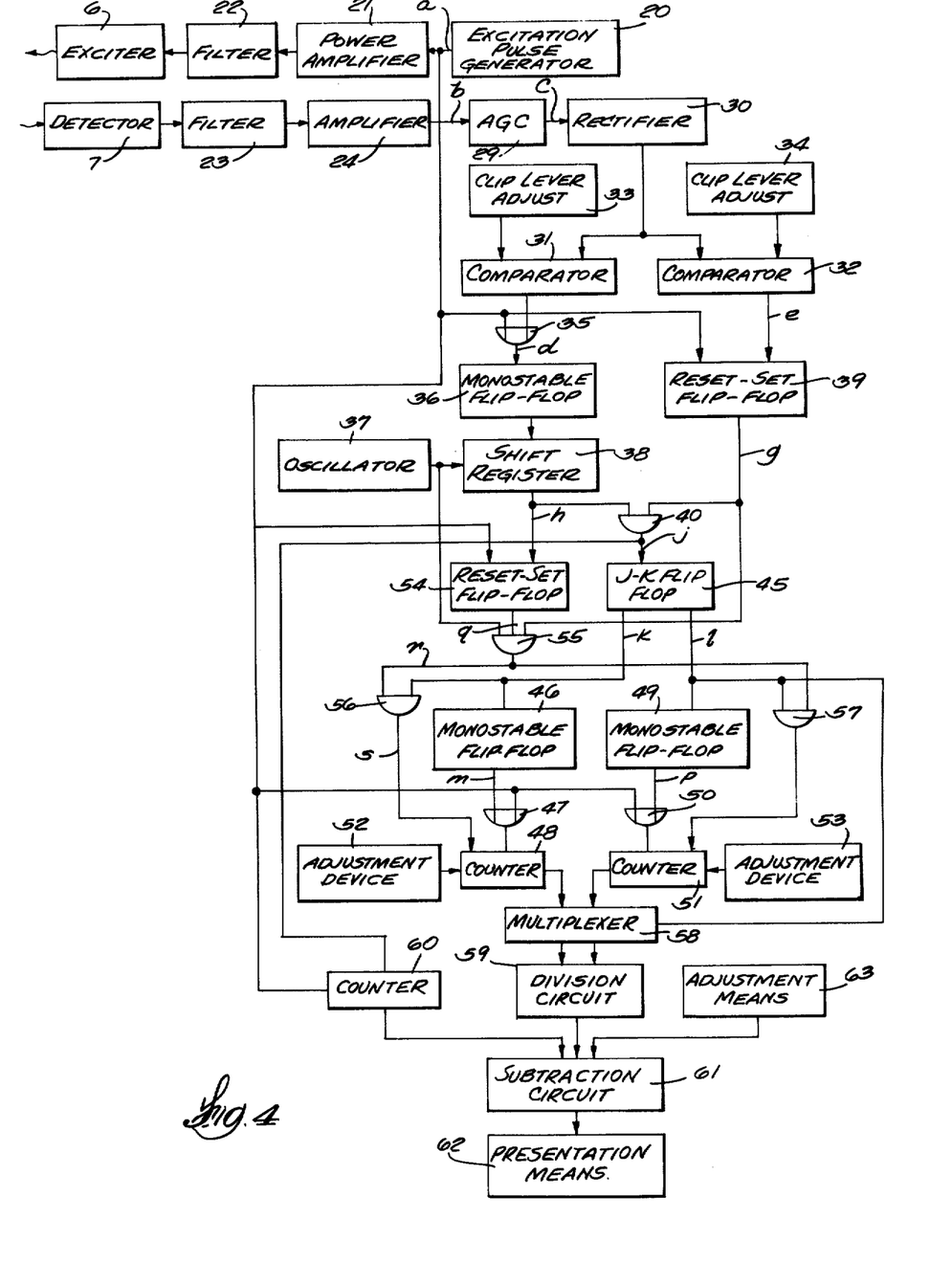
FIG. 4 is a block diagram of calculating apparatus for producing an output that signifies the level of liquid in a tank as measured by apparatus embodying the present invention.

As illustrated in FIG. 4, the calculating device comprises an excitation pulse generator 20 that is connnected through a power amplifier 21 and a filter 22 with the exciter 6. The pulse generator emits an excitation output $a$ (see FIG. 5) which is amplified by the amplifier 21 and accomodated to the exciter 6 by means of the filter 22, so that for each such excitation output the exciter can impart a brief period of vibration to the transmitting body 3. The excitation outputs $a$ can be generated at regular intervals, but the intervals between such outputs should be long enough to ensure that there will be complete return to the detector 7 of all of the resultant vibrations from any one output before return signals from a subsequent one begin to arrive at the detector.

As explained above, the vibration wave propagated through the transmitting body 3 reaches the receiving body 4 through the horizontal members 8 and through the liquid 2, causing the detector 7 to produce an electrical output signal that corresponds to the incoming vibrations. The detector is connected, in turn, with a filter 23 and an amplifier 24, and the filtered and amplified output of the detector is as depicted in line $b$ in FIG. 5. As there illustrated, the signal $b$ has three periods of oscillation 25, 26, 27, each of short duration and resulting from crosstalk through exposed bridging members 8, and one period of oscillation 28 of long duration, due to crosstalk through the liquid.

Figure 5:
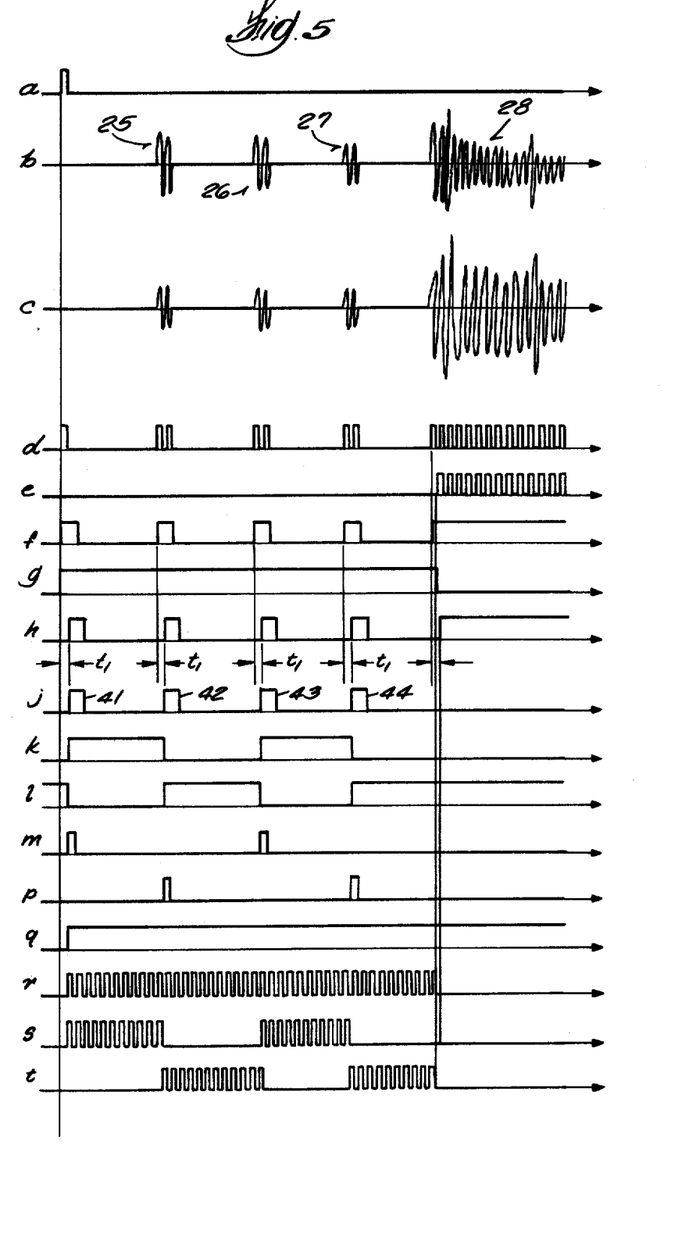
FIG. 5 is a graph of wave forms and pulses developed in the calculating apparatus illustrated in FIG. 4.

As is evident from line $b$, the oscillatory signals 25, 26, 27 that the detector 7 issues in response to crosstalks through the bridging members are of progressively decreasing amplitude and the signal 28 due to liquid crosstalk has a somewhat higher amplitude than any of them; but to accommodate the subsequent processing of the signals the amplified signals for crosstalks through the bridging members should all have the same amplitude, and the amplified signal for liquid crosstalk should have a substantially higher amplitude, all as illustrated by line $c$ of FIG. 5. To provide for such amplification, the amplifier 24 is connected with an automatic gain control circuit 29 which is so arranged as to automatically increase the gain factor of the amplifier 24 as necessary to maintain a constant amplitude level for the amplified signals for crosstalk through the bridging members but which does not permit the gain factor to be decreased until just before the issuance of a new excitation pulse $a$. Consequently the automatic gain control circuit tends to magnify the difference in amplitude as between the incoming bridging member crosstalk signals and those for liquid crosstalk. This difference in amplitude enables the calculating apparatus to discriminate between the two types of vibration. For the purposes of such discrimination the output of the automatic gain control circuit (the $c$ signal of FIG. 5) is fed to a full wave rectifier 30 whereby the negative portions of the signal $c$ are inverted as to phase, i.e., converted to positive signal portions.

The rectified signal is fed to a pair of comparators 31, 32, each operatively associated with manual means 33, 34, respectively, for controlling its clipping level. The output of the comparator 32 (line $e$, FIG. 5) is so adjusted by means of the control apparatus 34 that it comprises only that portion of the rectified signal that corresponds to the higher-amplitude oscillations 28 resulting from crosstalk through the liquid. The output of the comparator 31 corresponds to the entire $c$ signal, but rectified and clipped, and it is fed to one input of an OR-gate 35 that has its other input connected with the output of the excitation pulse generator 20. The output of the OR-gate 35, which is represented by line $s$ in FIG. 5, thus comprises a pulse coresponding to the excitation output $a$, succeeded at the correct intervals by pulse groups corresponding to the several crosstalks 25, 26, 27 through the horizontal members and the crosstalk 28 through the liquid.

Each of the groups of rectified and clipped oscillations represented by line $d$ comprises a rapid succession of pulses, but further processing now requires that each such group of pulses be converted into a single pulse having a duration substantially equal to the duration of the pulse group to which it corresponds. To that end the output of the OR-gate 35 is connected to the input of a monostable (one shot) flip-flop 36 that has a delay time slightly longer than one cycle of the sonic vibration frequency. The output of the monostable flip-flop is thus as depicted in line $f$ of FIG. 5 and comprises an initial pulse that is a somewhat prolonged version of the excitation output $a$, followed at intervals by pulses corresponding to crosstalk through each of the members 8, concluding with a rather long pulse corresponding to the crosstalk through the liquid. Since the signal $f$ can oly assume one or the other of two values, it can be regarded as a binary signal.

From the monostable flip-flop the signal $f$ is fed to a shift register 38 that is controlled by an oscillator 37. The output of the shift register, depicted in line $h$ of FIG. 5, corresponds to its input (line $f$) with a delay interval $t_1$ between input and output that is about equal to the cycle time of the oscillator 37 or a small multiple thereof.

At this point in the explanation it is necessary to return to the comparator 32, and it will be recalled that under the control of its clipping level adjustment means 34 that comparator produces an output (line $e$, FIG. 5) corresponding to only the crosstalk through the liquid and consisting of pulses at the vibration frequency. Cooperating with the comparator 32 is a reset-set (RS) flip-flop 39. An RS flip-flop has two input terminals -- "set" and "reset" -- and one output terminal. A "one" input to its set input terminal causes it to issue a one output; a one input to its reset input terminal causes it to issue a "zero" output. The output of the comparator 32 is connected with the reset terminal of the RS flip-flop 39, while the excitation pulse generator 20 has its output connected with the set terminal of that flip-flop. Hence the output of the RS flip-flop 39, as depicted in line $g$, FIG. 5, is one from the time the pulse generator 20 issues an excitation output $a$ until the beginning of pulses of the $e$ signal (i.e., until crosstalk through the liquid is received), and thereafter that flip-flop has a one output until another $a$ excitation output is issued.

The output g of the RS flip-flop 39 is fed into one of two inputs to an AND-gate 40. The other input to that AND-gate is connected with the output of the shift register 38 to receive the slightly delayed $h$ signal from it. The output of the AND-gate 40 is therefore as depicted in line $j$ of FIG. 5, which will be seen to correspond to line $h$ minus the prolonged pulse corresponding to the liquid crosstalk, the "and" condition not being satisfied during the duration of that prolonged pulse. Thus the $j$ signal comprises a pulse 41 corresponding to the excitation output $a$ and pulses 42, 43, 44 corresponding to the horizontal member crosstalks 25, 26, 27, but each of said pulses is delayed by an interval $t_1$. From comparison of line $j$ with lines $g$ and $h$ it will be evident that the delay $t_1$ interposed by the shift register assures complete blanking of the prolonged liquid crosstalk pulse, notwithstanding any slight delay interposed by the comparator 32 and the RS flip-flop 39.

The output $j$ of the AND-gate 40 is fed to a transverse member counter 60 that is described below and also to the clock input of a J-K flip-flop 45. A J-K flip-flop, as is well known, has a J (set) input, a K (reset) input, a C (clock) input, and two output terminals at which the outputs are always opposites of one another. In the somewhat unusual use here made of J-K flip-flop 45, a constant k"one" input is applied to each of the J and K input terminals and the $j$ signal output of the AND-gate 40 is applied to the clock input; hence the outputs at the two output terminals of the flip-flop 45 will reverse with each pulse of the $j$ signal from the AND-gate 40. The signals issuing from the two outputs of the flip-flop 45 are as respectively designated by line $k$ and $l$ of FIG. 5. Thus, the signal $k$ has a one value from the time of the (delayed) excitation pulse 41 to the beginning of the pulse 42 that corresponds to (delayed) crosstalk vibration 25 through the highest (first) horizontal member; and again from the beginning of each pulse (e.g. 43) that corresponds to crosstalk through an even-numbered horizontal member, and until the beginning of vibration through the next lower horizontal member; but it has a zero value at all other times. Conversely, the $l$ signal is zero at times when the $k$ signal is one and is one when the $k$ signal is zero.

The $k$ signal output of the J-K flip-flop 45 is fed to the input of a monostable (one-shot) flip-flop 46 which produces an output (line $m$ of FIG. 5) that consists of a brief pulse for the leading edge of each one pulse of the $k$ signal. In like manner the $l$ output of J-K flip-flop is fed to the input of another monostable flip-flop 49, the output of which is depicted in line $p$ of FIG. 5 and comprises a brief pulse for the leading edge of each one pulse of the $l$ signal.

The output $m$ of the monostable flip-flop 46 is connected with one input of an OR-gate 47 that has its other input connected with the excitation pulse generator 20. Similarly, the $p$ output of the monostable flip-flop 49 is connected with one input of an OR-gate 50 that has its other input connected with the excitation pulse generator.

The output of the OR-gate 47 is used to present a counter 48 in which pulses from the oscillator 37 are counted through those intervals prior to liquid crosstalk during which the $k$ signal has a one value. Similarly, the output of the OR-gate 50 is connected with the presetting input of a counter 51 in which clock pulses are counted through those intervals prior to liquid crosstalk during which the $l$ signal has a one value. The present value that is released into the counter 48 at a signal from the OR-gate 47 is stored in an adjustment device 52 that is connected with said counter. Similarly, the preset value released into the counter 51 is stored in an adjustment device 53.

Pulses from the oscillator 37 should be fed into the counters 48 and 51 only during the time from the beginning of the delayed excitation pulse 41 of the $j$ signal until the beginning of crosstalk through the liquid. To provide for gating the oscillator output to those counters only during that time, there is an RS flip-flop 54 that cooperates with an AND-gate 55 and a pair of further AND-gates 56 and 57. The RS flip-flop 54 khas its reset input connected with the output of the excitation pulse generator 20 and has its set input connected with the output of the shift register 38. Thus the output of the Rs flip-flop 54, which is depicted in line $q$ of FIG. 5, becomes zero when the excitation pulse generator issues an $a$ output, and then becomes one when the shift register issues its first $h$ output pulse thereafter, remaining one until the next excitation output is issued.

The $q$ output of the RS flip-flop 54 is fed to the AND-gate 55, which also receives an input from the oscillator 37 and a $g$ signal input from the RS flip-flop 39. It will be evident that the AND condition of the AND-gate 55 is fulfilled -- so that it can pass pulses from the oscillator 37 -- only during the time that both the $q$ and the $g$ signals have one values, i.e., from the beginning of a delayed excitation output until the $g$ signal goes to its zero value due to the beginning of crosstalk through the liquid. The output of the AND-gate 55 is depicted in line $r$ of FIG. 5 and is fed to one input of each of the pair of further AND-gates 56 and 57 that serve to gate the oscillator pulses to the respective counters 48 and 51 at the proper times.

The AND-gate 56 has its other input terminal connected with the $k$ output of the J-K flip-flop 49. Hence oscillator pulses are fed into the counter 48 whenever the $k$ and $g$ signals have one values concurrently, as depicted in line $s$ in FIG. 5. Similarly, the AND-gate 57 has its other input terminal connected with the $l$ signal output of the J-K flip-flop 45 and (as depicted in line $t$, FIG. 5) allows oscillator pulses to be fed into the counter 50 at times whenthe $r$ and the $l$ signals have concurrent one values.

At the beginning of the feeding of each group of pulses into each of the counters 48 and 51 the counter is reset by a pulse signal from its associated OR-gate 47 or 50. Thus at the beginning of crosstalk through the liquid, when the counting of oscillator pulses ceases, each counter 48, 51 will contain only the last such group of oscillator pulses fed into it, so that the contents of one counter will signify the distance between the two lowest exposed horizontal members 8 while that of the other will signify the distance between the lowest exposed member 8 and the surface of the liquid.

A multiplexer 58, controlled by the signal $l$ from the J-K flip-flop 45, in effect determines which of the counters 48, 51 holds which of the contents just mentioned. When the multiplexer has determined the prevailing order between the two counters, a division circuit 59 determines a quotient between the contents of the two counters 48 and 51, whichquotient is of course a function of the distance between the lowest exposed horizontal member and the surface of the liquid. However, it should be observed at this point that there is a constant error in the quotient just mentioned, owing to the fact that the beginning of pulse counts in the counters 48 and 51, which are determined by the $j$, $k$ and $l$ signals, have been delayed by the time $t_1$ whereas the termination of the last such count, which is determined by the $g$ signal, is not correspondingly delayed. Correction for this constant error is accomplished as explained below.

The counter 60 is a horizontal member counter. It has a reset input connected with the excitation pulse generator 20, so that it is set to zero by each excitation output signal $a$, and has a counting input connected with the output of the AND-gate 40 to receive the $j$ signal pulses. Hence the contents of the counter 60 denotes the number of horizontal members that are exposed above the liquid.

The counter 60 and the division circuit 59 are connected, through a subtraction circuit 61, with a presentation means 62. The subtraction circuit adds the distance denoted by the number of exposed bridging members to the distance between the lowest exposed bridging member and the surface of the liquid. A correction term, controllable by means of a manual adjustment means 63 that is connected with the subtraction circuit, is subtracted from this sum. The correction term, which includes compensation for counting of the delayed excitation pulse 41 (line $j$), establishes the datum to which the zero level of the liquid is referred (e.g., the roof of the tank), and also provides for correction of the above mentioned constant error.

The presentation means is arranged to provide a suitable indication of the liquid level, with the accuracy that is desired for the particular installation.

For detailed information about the flip-flops, counters and the like that are illustrated in block form in FIG. 4, reference may be made to standard handbooks and texts, e.g., The Integrated Circuits Catalogue for Design Engineers, published by Texas Instruments, Inc.

It will be appreciated that when the apparatus includes a plurality of elongated receiving bodies, as illustrated in FIGS. 2a–2c, the calculating apparatus described above will be modified in a manner that will be readily understood by those skilled in the art.

From the foregoing description taken with the accompanying drawings it will be apparent that this invention provides a very accurate liquid level apparatus for indicating the level of liquid in a tank with the use of sonic vibrations, which apparatus retains its accuracy notwithstanding variations in physical and chemical characteristics of liquid in the tank in which it is installed or of gas above such liquid.

Those skilled in the art will appreciate that the invention can be embodied in forms other than as herein disclosed for purposes of illustration.

The invention is defined by the following claims:

1. Apparatus for measuring the level of the top surface of liquid in a tank, of the type comprising a first elongated vibration propagating body that extends downwardly in the tank from near its top, exciter means coupled to said body for recurrently imparting an excitation impulse to it that produces sonic vibration in it, at least one other elongated vibration propagating body extending down into the tank from near its top, detector means coupled to said other body for producing electrical signals in response to vibrations propagated through said other body from the exciter means and by way of the first body, and calculating means connected with said exciter means and said detector means for calculating liquid level in the tank as a function of time required for propagation of vibrations from the exciter means to the detector means, said apparatus being characterized by:

A. a plurality of elongated bridging members extending transversely to said bodies and each connected to both of said bodies, said bridging members being fixed to said bodies at lengthwise spaced intervals along them and being of substantially rigid material that propagates vibration so that as a result of each excitation of the first body, the detector means, during a time thereafter, receives successive periods of vibration, one transmitted through each of said bridging members and a final one transmitted through the liquid; and
B. the calculating means comprising
  1. means for counting the number of periods of vibration received by the detector means following each excitation impulse,
  2. means for recording the time elapsed between receipt by the receiver of the last and the second-last of such periods of vibration, and
  3. means for presenting an output representing a distance which corresponds to said number minus one plus a function of said elapsed time, and which output denotes said level.

2. The apparatus of claim 1 wherein said bridging members are spaced apart at uniform vertical intervals.

3. The apparatus of claim 1, further characterized by:
C. a further vibration propagating body, coupled with a second detector means and spaced twice as far laterally from the first body as said other body; and
D. other bridging members connected between said first body and said further body.

4. The apparatus of claim 2 wherein said elongated bodies are arranged at the corners of an isosceles triangle.

5. The apparatus of claim 2 wherein said bridging members that are connected between said first body and said other body are in vertically offset relation to said other bridging members.

6. The apparatus of claim 1, further characterized by: each of said bridging members being made of a material that substantially attenuates vibration propagated through it.

7. The apparatus of claim 1 wherein said other body has means extending along its length whereby it is provided with surface irregularities that scatter and reflect sound vibrations and encourage vibrations propagated into it from liquid in which it is immersed to travel upwardly along it.

8. The apparatus of claim 1, further characterized by:
C. reflector means for increasing the transfer of sonic vibration from the liquid to said other body and for encouraging upward propagation in said other body of vibrations transferred into it, said reflector means comprising
  1. means defining a horizontal surface and
  2. means for supporting said horizontal surface defining means at a level just below the surface of the liquid and at a location between the bodies.

9. The apparatus of claim 8 wherein said means for supporting the horizontal surface defining means comprises an upright support, and wherein said horizontal surface defining means comprises means defining a plurality of horizontally extending surface elements at vertically spaced apart levels, so that one of said surface elements will always be just below the surface of liquid in the tank.

10. The apparatus of claim 8 wherein said means for supporting said horizontal surface defining means comprises a float.

11. Apparatus for measuring the level of the top surface of liquid in a tank, of the type comprising at least two elongated vibration propagating bodies extending vertically in the tank from near the top thereof in spaced parallel relation to one another, exciter means coupled to the top of one of said bodies for imparting to said one body an excitation impulse that causes sonic vibration to be propagated downwardly through it, detector means coupled to the other body for producting electrical signals in response to vibrations propagated up through said other body from the exciter means and by way of said one body, and calculating means connected with said exciter means and said detector means, for calculating liquid level in the tank as a function of time required for propagation of vibrations from the exciter means to the detector means, said apparatus being characterized by:
A. a plurality of rigid, elongated, horizontal members, each connected in bridging relation to both of said bodies to transmit vibration from said one to said other of them, said horizontal members being vertically spaced apart so that an excitation impulse causes a succession of periods of vibration to be detected by the detector means as vibration is propagated to said other body through each in turn of the horizontal members and finally through the liquid;
B. the calculating means comprising
  1. means for recording the number of periods of vibration detected by the detector means in consequence of each excitation impulse, said number minus one corresponding to a distance between the top of the tank and the lowest exposed horizontal member,
  2. oscillator means for generating pulses at a frequency high enough so that a plurality of pulses are generated between successive such periods of vibration detected by the detector means,
  3. means for counting the pulses generated by the oscillator means during each of the two intervals between the three last such periods of vibration following an excitation impulse, and
  4. means for deriving a quotient relationship between the number of pulses counted during each of said two intervals, said quotient relationship corresponding to the distance between the lowest exposed horizontal member and the surface of the liquid; and
C. means connected with said calculating means for presenting a display corresponding to a function of said number minus one plus said quotient relationship, and which display denotes the level of liquid in the tank.

12. The apparatus of claim 11, further characterized by:
  1. each of said horizontal members being made of a material through which vibration is propagated with substantial attenuation; and
  2. means operatively associated with said other body for scattering and reflecting vibrations in liquid adjacent to said other body and near the top surface of said liquid, to encourage transfer of vibrations from said liquid to said other body and their upward propagation in said other body, so that vibration which has come to said detector means through the liquid will tend to have a higher amplitude than vibration which has come to it through the horizontal members.

* * * * *